Oct. 14, 1969 K. MAAZ ET AL 3,473,109

POSITION SENSOR UTILIZING A HALL GENERATOR

Filed Sept. 15, 1967

United States Patent Office
3,473,109
Patented Oct. 14, 1969

3,473,109
POSITION SENSOR UTILIZING A HALL GENERATOR

Karl Maaz, Nurnberg, and Günther Didschies, Uttenreuth, Germany, assignors to Siemens Aktiengesellschaft, Berlin, Germany, a corporation of Germany Filed Sept. 15, 1967, Ser. No. 668,063
Claims priority, application Germany, Sept. 22, 1966, S 106,028
Int. Cl. G01r *33/00, 33/06;* G08b *21/00*
U.S. Cl. 324—34 6 Claims

ABSTRACT OF THE DISCLOSURE

A pair of permanent magnets are coplanarly positioned within and enclosed by a ferromagnetic circuit. The magnets are in juxtaposition and are affixed to a first surface of the ferromagnetic circuit with a pair of their opposite poles abutting the first surface, the other pair of opposite poles being spaced from a second opposite surface of the ferromagnetic circuit to form an air gap therewith. A non-magnetic housing is movably mounted in proximity with the air gap in a plane substantially parallel to the plane of the pair of magnets and the ferromagnetic circuit and substantially perpendicularly to lines of flux in the air gap. A Hall generator is mounted in the housing in the air gap for movement with the housing.

DESCRIPTION OF THE INVENTION

The present invention relates to a position sensor utilizing a Hall generator. More particularly, the invention relates to a position sensor which utilizes a Hall generator for determining position.

It is desirable to provide a position sensor which is hysteresis-free and which operates as an analog unit. In order to provide such a position sensor, a great number of electronic components must be utilized and therefore the cost of providing such a sensor is considerable.

The principal object of the present invention is to provide a new and improved position sensor. The position sensor of the present invention utilizes a Hall generator and is hysteresis-free and functions as an analog unit. The position sensor of the present invention utilizes a minimum of components and is inexpensive to make and use. The position sensor of the present invention functions to sense position with accuracy, facility and reliability.

In accordance with the present invention, a position sensor comprises a ferromagnetic circuit having first and second opposite surfaces. A pair of permanent magnets are coplanarly positioned within and enclosed by the ferromagnetic circuit. The magnets are in juxtaposition with their opposite poles next adjacent each other. Each of the magnets has a magnetic field directed oppositely to that of the other and extending substantially parallel to that of the other. The magnets are affixed to the first surface of the ferromagnetic circuit with a pair of their opposite poles abutting the first surface of the ferromagnetic circuit. The other pair of opposite poles are spaced from the second surface of the ferromagnetic circuit to form an air gap therewith. A non-magnetic housing is movably mounted in proximity with the air gap in a plane substantially parallel to the plane of the pair of magnets and the ferromagnetic circuit and substantially perpendicularly to lines of flux in the air gap. A Hall generator is mounted in the housing in the air gap for movement with the housing.

In one embodiment of the invention, the ferromagnetic circuit has a base portion and a pair of spaced substantially parallel arms extending substantially perpendicularly from the ends of the base portion to form a substantially U-shape and a yoke portion substantially parallel to the base portion and extending from the free end of one of the arms to the free end of the other of the arms. The pair of magnets are affixed to the base portion of the ferromagnetic circuit at the pair of their opposite poles and the other pair of opposite poles of the pair of magnets are spaced from the yoke portion of the ferromagnetic circuit. The magnets are of rod-like configuration and are symmetrically positioned with the axis of symmetry of the ferromagnetic circuit. The non-magnetic housing is mounted for movement along the yoke portion of the ferromagnetic circuit.

In another embodiment of the invention, the ferromagnetic circuit has a base portion of substantially linear configuration and a yoke portion of substantially semicircular configuration. The ends of the base and yoke portions are in contact with each other. The pair of magnets are affixed to the base portion of the ferromagnetic circuit at the pair of their opposite poles and the other pair of opposite poles of the pair of magnets are spaced from the yoke portion of the ferromagnetic circuit.

The magnets are of rod-like configuration and are symmetrically positioned with the axis of symmetry of the ferromagnetic circuit. The non-magnetic housing is mounted for movement along the yoke portion of the ferromagnetic circuit.

Due to the affixing of the pair of magnets to the ferromagnetic circuit with a pair of the opposite poles of said magnets abutting said ferromagnetic circuit and due to the housing of the Hall generator in a non-magnetic housing, the path of the lines of flux across the air gap between the other pair of opposite poles of the magnets of the ferromagneitc circuit remains unchanged even when the Hall generator is moved. It is the unchanged or constant path of the lines of flux of the ferromagnetic circuit which provides hysteresis-free apparatus.

In order that the present invention may be readily carried into effect, it will now be described with reference to the accompanying drawings, wherein.

Figures 1, 2, 3, 4, 4B:
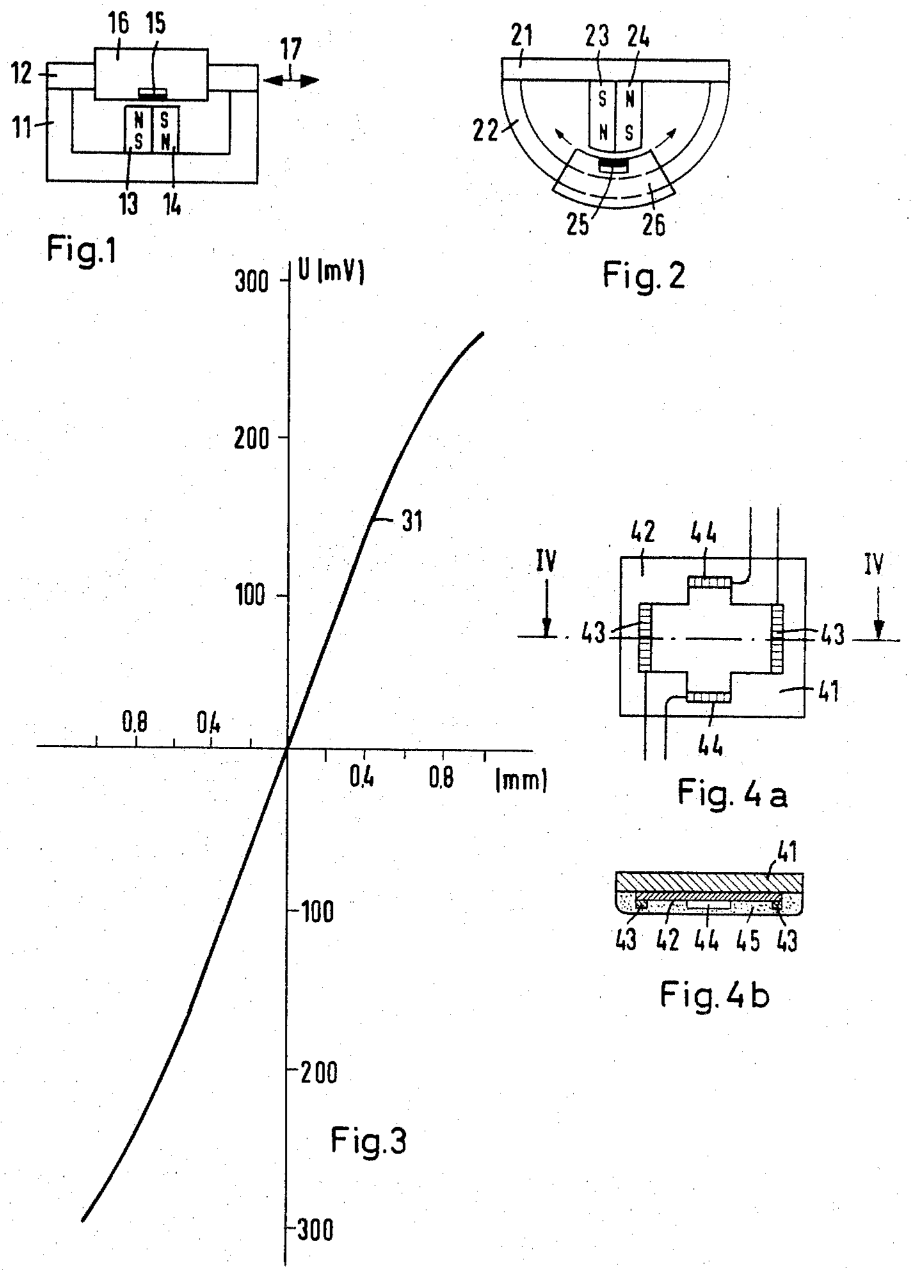
FIG. 1 is a schematic presentation of an embodiment of the position sensor of the present invention.
FIG. 2 is a schematic presentation of another embodiment of the position sensor of the present inveniton.
FIG. 3 is a graphic presentation illustrating the relation between position and the indication provided by the position sensor of the present invention.

FIG. 4*a* is a top view of a Hall generator which may be utilized in the embodiment of FIG. 1 or 2; and FIG. 4*b* is a view taken along the lines IV—IV of FIG. 4*a*.

FIG. 1 is an embodiment of the present invention which is especially adapted for high precision sensing of position. A ferromagnetic circuit is of substantially U-shape 11 and comprises a base portion and a pair of spaced substantially parallel arms extending substantially perpendicularly from the ends of the base portion. A yoke portion 12 of substantially linear configuration is substantially parallel to the base portion and extends from the free end of one of the arms to the free end of the other of the arms of the U-shaped part of the ferromagnetic circuit.

The yoke portion 12 thus closes the ferromagnetic circuit. The yoke portion of the ferromagnetic circuit may comprise, for example, Mu metal. A first surface is provided by the base portion of the ferromagnetic circuit and a second opposite surface is provided by the yoke 12 of said ferromagnetic circuit.

A pair of permanent magnets 13 and 14 of rod-like configuration are coplanarly positioned within and enclosed by the ferromagnetic circuits 11, 12. The magnets 13 and 14 are in juxtaposition with their opposite poles next adjacent each other, so that the North pole of each is adjacent the South pole of the other. Each of the magnets 13 and 14 has a magnetic field directed oppositely to that of the other and extending substantially parallel to that of the other.

The pair of magnets 13 and 14 are affixed to the base portion or first surface of the ferromagnetic circuit with a pair of their opposite poles abutting said first surface or base portion of said ferromagnetic circuit. The other pair of opposite poles of the magnets 13 and 14 are spaced from the second surface or yoke portion 12 of the ferromagnetic circuit to form an air gap with said ferromagnetic circuit. The magnets 13 and 14 need not be in abutting relationship with each other, but may be spaced a slight distance from each other. The ferromagnetic circuits 11, 12 have an axis of symmetry which passes through the center of each of and is perpendicular to each of the base portion and the yoke portion. The magnets 13 and 14 are symmetrically positioned with the axis of symmetry of the ferromagnetic circuits 11, 12.

A Hall generator 15 is mounted in a non-magnetic housing 16 in the air gap. The Hall generator 15 moves with the non-magnetic housing 16 which is movably mounted in close proximity with the air gap between the magnets 13 and 14 and the yoke 12. The housing 16 may comprise, for example, brass. The housing 16 is mounted on the yoke 12 for movement along said yoke in the direction of the arrows 17. The housing 16 may thus move in a plane substantially parallel to the plane of the magnets 13 and 14 and the ferromagnetic circuits 11, 12 and substantially perpendicularly to the lines of flux in the air gap.

The Hall generator 15 is of known type, as described with reference to FIGS. 4*a* and 4*b*, and may be enclosed in a non-magnetic wrapper.

The embodiment of FIG. 2 of the present invention is especially adapted for the measurement of small angles. In FIG. 2, the ferromagnetic circuit has a base portion 21 of substantially linear configuration and a yoke portion 22 of substantially semicircular configuration. The ends of the base portion 21 and the yoke portion 22 are in contact with each other. The pair of magnets 23 and 24 are affixed to the base portion or first surface of the ferromagnetic circuits 21, 22 at a pair of their opposite poles with said pair of their opposite poles abutting said base portion. The other pair of opposite poles of the pair of magnets 23 and 24 are spaced from the yoke portion 22 or second surface of the ferromagnetic circuits 21, 22 to form an air gap with said yoke portion. As in the embodiment of FIG. 1, the magnets 23 and 24 are in juxtaposition with their opposite poles next adjacent each other, so that the North pole of each is adjacent the South pole of the other.

The embodiments of FIGS. 1 and 2 are similar, with the exception of the configuration of the closed ferromagnetic circuit of each and the configuration of the non-magnetic housing of each. In FIG. 2, a Hall generator 25 is mounted in a non-magnetic housing 26 in the air gap between the magnets and the yoke portion 22. The Hall generator moves with the housing 26 which is movably mounted in close proximity with the air gap for movement along the yoke portion 22 in a plane substantially parallel to the plane of the pair of magnets 23 and 24 and the ferromagnetic circuits 21, 22 and substantially perpendicularly to lines of flux in the air gap.

As in the embodiment of FIG. 1, the Hall generator 25 of FIG. 2 may comprise a known type of Hall generator, as described with reference to FIGS. 4*a* and 4*b*. The Hall generator 25 in the housing 26 may be enclosed in a non-magnetic wrapper.

In each of the embodiments of FIGS. 1 and 2, energization or excitation of the Hall generator and movement of the non-magnetic housing produces a position indication illustrated in FIG. 3. In FIG. 3, the abscissa represents the movement or displacement of the Hall generator relative to the magnets. The indication of the abscissa is thus the displacement of the Hall generator along the yoke portion of the ferromagnetic circuit in millimeters.

In FIG. 3, the ordinate represents the Hall voltage U in millivolts produced by the Hall generator upon the energization or excitation of said Hall generator by a constant control current. The curve 31 of FIG. 3 is thus an indication of the Hall voltage versus the displacement or positioning of the Hall generator and is therefore an indication of the position of said Hall generator. The apparatus of each of FIGS. 1 and 2 thus produce an indication of position and therefore functions as a position sensor.

The position indication of FIG. 3 may be varied by variation of the surface configuration of the poles of the permanent magnets which form the air gap with the yoke portion of the ferromagnetic circuit.

In FIGS. 4*a* and 4*b*, a non-magnetic support plate 41 may comprise, for example, aluminum oxide or $Al_2O_3$. The Hall generator comprises a semiconductor layer 42 on the support plate 41. The semiconductor layer 42 may comprise, for example, indium antimonide or InSb. The Hall generator is provided with a pair of spaced, parallel, oppositely disposed control current electrodes 43 and a pair of spaced, parallel, oppositely disposed Hall electrodes 44. The Hall electrodes and the control current electrodes are disposed in perpendicular relation to each other, in the usual manner.

A constant current is supplied to the Hall generator via the control current electrodes 43. The Hall voltage is derived from the Hall electrodes 44. As indicated in FIG. 4*b*, a protective coat or layer 45 of suitable material such as, for example, varnish, may be utilized.

We claim:

1. A position sensor which operates as an analog unit, comprising:

a closed ferromagnetic circuit having first and second opposite surfaces;

only a pair of permanent magnets coplanarly positioned within and enclosed by said ferromagnetic circuit, said magnets being in juxtaposition with their opposite poles next adjacent each other, each of said magnets having a magnetic field directed oppositely to that of the other and extending substantially parallel to that of the other, said magnets being affixed to the first surface of said ferromagnetic circuit with a pair of their opposite poles abutting said first surface of said ferromagnetic circuit, the other pair of opposite poles being spaced from the second surface of said ferromagnetic circuit to form a single air gap therewith;

non-magnetic housing means movably mounted in proximity with said air gap in a plane substantially parallel to the plane of said pair of magnets and said ferromagnetic circuit and substantially perpendicularly to lines of flux in said air gap; and a Hall generator mounted in said housing in said air gap for movement with said housing and therefore being hysteresis-free and sensitive to the most minute change in position of said magnets and said generator relative to each other.

2. A position sensor as claimed in claim 1, wherein said ferromagnetic circuit has a base portion and a pair of spaced substantially parallel arms extending substantially perpendicularly from the ends of said base portion to form a substantially U-shape and a yoke portion substantially parallel to said base portion and extending from the free end of one of said arms to the free end of the other of said arms and wherein said pair of magnets are affixed to the base portion of said ferromagnetic circuit at said pair of their opposite poles and said other pair of opposite poles of said pair of magnets are spaced from said yoke portion of said ferromagnetic circuit.

3. A position sensor as claimed in claim 1, wherein said magnets are of rod-like configuration.

4. A position sensor as claimed in claim 1, wherein said ferromagnetic circuit has a base portion of substantially linear configuration and a yoke portion of substantially semi-circular configuration, the ends of said base and yoke portions being in contact with each other and wherein said pair of magnets are affixed to the base portion of said ferromagnetic circuit at said pair of their opposite poles and said other pair of opposite poles of said pair of magnets are spaced from said yoke portion of said ferromagnetic circuit.

5. A position sensor as claimed in claim 2, wherein said ferromagnetic circuit has an axis of symmetry and said magnets are of rod-like configuration and are symmetrically positioned with the axis of symmetry of said ferromagnetic circuit and wherein said non-magnetic housing means is mounted for movement along the yoke portion of said ferromagnetic circuit.

6. A position sensor as claimed in claim 4, wherein said ferromagnetic circuit has an axis of symmetry and said magnets are of rod-like configuration and are symmetrically positioned with the axis of symmetry of said ferromagnetic circuit and wherein said non-magnetic housing means is mounted for movement along the yoke portion of said ferromagnetic circuit.

References Cited

UNITED STATES PATENTS

| | | | |
|---|---|---|---|
| 2,700,758 | 1/1955 | Smith | 324—34 X |
| 3,118,108 | 1/1964 | Zoss et al. | 324—45 |
| 3,199,630 | 8/1965 | Engel et al. | |
| 2,536,805 | 1/1951 | Hansen | 324—45 XR |
| 3,164,013 | 1/1965 | Schmahl et al. | |

RUDOLPH V. ROLINEC, Primary Examiner

A. E. SMITH, Assistant Examiner

U.S. Cl. X.R.

324—45; 340—282